US012720272B2

(12) United States Patent
Enomoto et al.

(10) Patent No.: US 12,720,272 B2
(45) Date of Patent: Aug. 25, 2026

(54) ACOUSTIC REPRODUCTION METHOD, ACOUSTIC REPRODUCTION DEVICE, AND RECORDING MEDIUM

(71) Applicant: Panasonic Intellectual Property Corporation of America, Torrance, CA (US)

(72) Inventors: Seigo Enomoto, Kyoto (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 169 days.

(21) Appl. No.: 18/830,882

(22) Filed: Sep. 11, 2024

(65) Prior Publication Data

US 2024/0430638 A1 Dec. 26, 2024

Related U.S. Application Data

(63) Continuation of application No. 17/939,114, filed on Sep. 7, 2022, now Pat. No. 12,120,500, which is a (Continued)

(30) Foreign Application Priority Data

Oct. 15, 2020 (JP) ................................ 2020-174083

(51) Int. Cl.

*H04R 5/02* (2006.01)
*G10L 19/008* (2013.01)

(Continued)

(52) U.S. Cl.

CPC ............ *H04S 7/304* (2013.01); *G10L 19/008* (2013.01); *H04S 3/008* (2013.01); *H04S 2400/01* (2013.01);

(Continued)

(58) Field of Classification Search

CPC ...... H04S 7/304; H04S 3/008; H04S 2400/11; H04S 2400/15; H04S 2420/01; G10L 19/008

(Continued)

(56) References Cited

U.S. PATENT DOCUMENTS

| | | | | |
|---|---|---|---|---|
| 10,506,362 B1 | 12/2019 | Gomes | | |
| 2015/0195641 A1* | 7/2015 | Di Censo ............. | H04R 1/1083 381/71.6 | |

(Continued)

FOREIGN PATENT DOCUMENTS

| | | |
|---|---|---|
| JP | 2006-333067 | 12/2006 |
| JP | 2009-177696 | 8/2009 |
| JP | 2017-92732 | 5/2017 |

OTHER PUBLICATIONS

International Search Report issued Jun. 8, 2021 in International (PCT) Application No. PCT/JP2021/009919.

(Continued)

*Primary Examiner* — Ammar T Hamid
(74) *Attorney, Agent, or Firm* — Wenderoth, Lind & Ponack, L.L.P.

(57) ABSTRACT

An acoustic reproduction method includes: localizing a first sound image at a first position in a target space in which a user is present; and localizing, at a second position in the target space, a second sound image that represents an anchor sound for indicating a reference position.

16 Claims, 6 Drawing Sheets

Related U.S. Application Data continuation of application No. PCT/JP2021/009919, filed on Mar. 11, 2021.

(60) Provisional application No. 62/990,018, filed on Mar. 16, 2020.

(51) Int. Cl.
*H04S 3/00* (2006.01)
*H04S 7/00* (2006.01)

(52) U.S. Cl.
CPC ....... *H04S 2400/11* (2013.01); *H04S 2400/15* (2013.01); *H04S 2420/01* (2013.01)

(58) Field of Classification Search
USPC .................................................. 381/303, 310
See application file for complete search history.

(56) References Cited

U.S. PATENT DOCUMENTS

| | | | |
|---|---|---|---|
| 2019/0349703 | A1 | 11/2019 | Zilberman |
| 2019/0392830 | A1 | 12/2019 | Abdollahian |

OTHER PUBLICATIONS

Kazunori Itoh et al., "Transmission of image information through auditory sensation using control of sound lateralization-Improvement of display efficiency by addition of marker tone-", The Journal of the Acoustical Society of Japan, 42(9), 1986, pp. 708-715, (Received on Dec. 5, 1985).

Extended European Search Report issued Jul. 27, 2023 in corresponding European Patent Application No. 21771849.3.

* cited by examiner

ACOUSTIC REPRODUCTION METHOD, ACOUSTIC REPRODUCTION DEVICE, AND RECORDING MEDIUM

CROSS REFERENCE TO RELATED APPLICATIONS

This is a continuation of U.S. Application Ser. No. 17/939,114, filed Sep. 7, 2022, which is a continuation application of PCT International Application No. PCT/JP2021/009919 filed on Mar. 11, 2021, designating the United States of America, which is based on and claims priority of Japanese Patent Application No. 2020-174083 filed on Oct. 15, 2020 and U.S. Provisional Patent Application No. 62/990,018 filed on Mar. 16, 2020. The entire disclosures of the above-identified applications, including the specifications, drawings and claims are incorporated herein by reference in their entirety.

FIELD

The present disclosure relates to an acoustic reproduction method, an acoustic reproduction device, and a recording medium.

BACKGROUND

Techniques relating to acoustic reproduction for causing a user to perceive stereophonic sounds by presenting sound images at desired positions within a three-dimensional space have been conventionally known (for example, see Patent Literature (PTL) 1 and Non Patent Literature (NPL) 1).

CITATION LIST

Patent Literature

PTL 1: Japanese Unexamined Patent Application Publication No. 2017-92732

Non Patent Literature

NPL 1: Itoh, K., Yonezawa, Y., & Kido, K. (1986) Transmission of image information through auditory sensation using control of sound lateralization: Improvement of display efficiency by addition of marker tone. The Journal of the Acoustical Society of Japan, 42(9), 708-715.

SUMMARY

Technical Problem

The present disclosure aims to provide an acoustic reproduction method, an acoustic reproduction device, and a recording medium which improve presentation of a sound image.

Solution to Problem

An acoustic reproduction method according to one aspect of the present disclosure includes: localizing a first sound image at a first position in a target space in which a user is present; and localizing a second sound image at a second position in the target space, the second sound image representing an anchor sound for indicating a reference position.

A recording medium according to one aspect of the present disclosure is a non-transitory computer-readable recording medium for use in a computer, the recording medium having a computer program recorded thereon for causing the computer to execute the above-described acoustic reproduction method.

An acoustic reproduction device according to one aspect of the present disclosure includes: a decoder that decodes an encoded sound signal, the encoded sound signal causing a user to perceive a first sound image; a first localizer that localizes, according to the encoded sound signal that has been decoded, the first sound image at a first position in a target space in which the user is present; and a second localizer that localizes a second sound image at a second position in the target space, the second sound image representing an anchor sound for indicating a reference position.

Note that these general or specific aspects may be realized by a system, a method, an integrated circuit, a computer program, or a non-transitory computer-readable recording medium such as a compact disc read only memory (CD-ROM), or by any optional combination of systems, methods, integrated circuits, computer programs, and recording media.

Advantageous Effects

An acoustic reproduction method, a recording medium, and an acoustic reproduction device according to the present disclosure are capable of improving presentation of a sound image.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
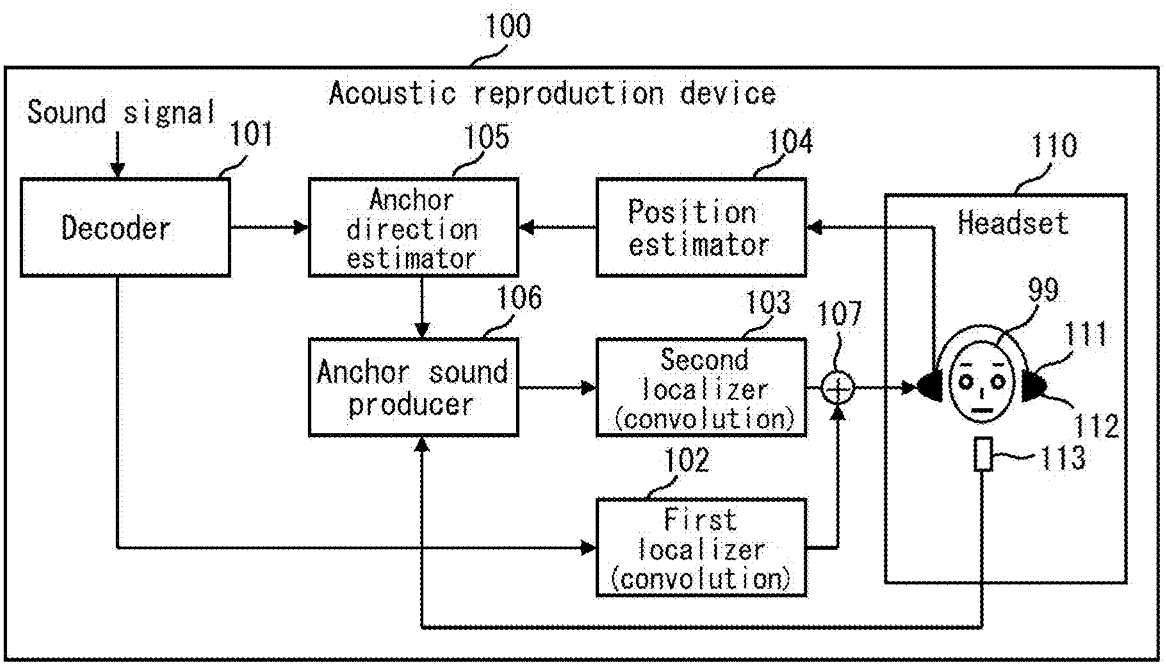
FIG. 1 is a block diagram illustrating an example of a configuration of an acoustic reproduction device according to Embodiment 1.

Underlying Knowledge Forming Basis of the Present Disclosure

In relation to the conventional techniques disclosed in the Background Art section, the inventors have found the following problems.

PTL 1 proposes an auditory supporting system capable of assisting an auditory sense of a user by reproducing a three-dimensional sound environment observed in a target space for the user. The auditory supporting system disclosed by PTL 1 synthesizes a sound signal for reproducing a sound in each ear of the user from separation sound signals, using a head-related transfer function from the position of a sound source to each ear of the user according to the position of the sound source and an orientation of the face in the target space. The auditory supporting system further corrects a sound volume for each of frequency bands according to characteristics of hardness of hearing. With this, the auditory supporting system can realize agreeable auditory support, and can optionally control necessary sounds and unnecessary sounds for a user by separating individual sounds in an environment.

However, PTL 1 poses the following problems. Although PTL 1 controls frequency characteristics, PTL 1 only uses a head-related transfer function for sound localization. For this reason, it is difficult for a user to accurately perceive the position of a sound image in the height direction. In other words, compared to the left-right direction with respect to the head or the ears of a user, the problem of difficulty in accurately perceiving a sound image in the up-down direction, namely, the height direction, remains unsolved.

NPL 1 proposes, as one method of assisting visual impairment, a technique of transmitting an image including text via the auditory sense. The sound image display device according to NPL 1 associates positions of synthesized sounds with positions of pixels, temporally changes the associations, and scans the associations as point sound images to produce a display image in a space perceivable by both ears. The sound image display device according to NPL 1 further adds, within a display surface, a point sound image (called as a marker sound) that is an indicator of a position that does not merge with a sound image of a display point, and clarifies the relative positional relationship with the display point to enhance localization accuracy of the display point using the auditory sense. White noise that favorably produces an additional effect is used for the marker sound, and the marker sound is set at the central position in the left-right direction.

However, NPL 1 poses the following problems. Since a marker sound is noise to a point sound image as a display point, the disclosure of NPL 1 reduces the quality of acoustics when used for virtual reality (VR), augmented reality (AR), mixed reality (MR), and the like, and interferes with the sense of immersion that a user experience.

In view of the above, the present disclosure provides an acoustic reproduction method, an acoustic reproduction device, and a recording medium which improve presentation of a sound image.

For this reason, an acoustic reproduction method according to one aspect of the present disclosure includes: localizing a first sound image at a first position in a target space in which a user is present; and localizing a second sound image at a second position in the target space. The second sound image represents an anchor sound for indicating a reference position.

With this, presentation of a sound image of a first sound can be improved. Specifically, the first sound image is made perceivable according to a relative positional relationship between the first sound image and a second sound image as an anchor sound. Therefore, it is possible to accurately present the sound image of the first sound, even when the first sound image is positioned in the height direction.

For example, in the localizing of the second sound image, the acoustic reproduction method may use some of ambient sounds or some of reproduced sounds in the target space as a sound source of the anchor sound.

With this, since some of ambient sounds or some of reproduced sounds in a space are used as the sound source of an anchor sound, a reduction in the quality of acoustics can be prevented. For example, it is possible to prevent the anchor sound from interfering with the sense of immersion that a user experience.

For example, the acoustic reproduction method may further include obtaining, using a microphone, ambient sounds arriving at the user from a direction of the second position in the target space. In the localizing of the second sound image, the ambient sounds obtained may be used as a sound source of the anchor sound.

With this, since some of ambient sounds or some of reproduced sounds in a space are used as the sound source of an anchor sound, a reduction in the quality of acoustics can be prevented. For example, it is possible to prevent the anchor sound from interfering with the sense of immersion that a user experience.

For example, the acoustic reproduction method may further include: obtaining, using a microphone, ambient sounds arriving at the user in the target space; selectively obtaining, from among the ambient sounds obtained, a sound that satisfies a predetermined condition; and determining a position in a direction of the sound selectively obtained to be the second position.

With this, a degree of freedom in selecting a sound as the sound source of an anchor sound is enhanced, and thus the second position can be adaptably set.

For example, the predetermined condition may relate to at least one of an arrival direction of a sound, duration of a sound, intensity of a sound, a frequency of a sound, and a type of a sound.

With this, an appropriate sound can be selected as the sound source of an anchor sound.

For example, as a condition indicating an arrival direction of a sound, the predetermined condition may include an angular range indicating a direction (i) not including a vertical direction with respect to the user, and (ii) including a forward direction and a horizontal direction with respect to the user.

With this, as an anchor sound, a sound in a direction in which sounds are comparatively accurately perceived, namely, a direction closer to the horizontal direction can be selected.

For example, as a condition indicating intensity of a sound, the predetermined condition may include a predetermined intensity range.

With this, as an anchor sound, a sound having appropriate intensity can be selected.

For example, as a condition indicating a frequency of a sound, the predetermined condition may include a particular frequency range.

With this, as an anchor sound, a sound with an appropriate frequency which is readily perceived can be selected.

For example, as a condition indicating a type of a sound, the predetermined condition may include a human voice or a special sound.

With this, as an anchor sound, an appropriate sound can be selected.

For example, the localizing of the second sound image may include adjusting intensity of the anchor sound according to intensity of a first sound source.

With this, the volume of an anchor sound can be adjusted according to a relative relationship with the first sound source.

For example, an elevation angle or a depression angle of the second position with respect to the user may be smaller than a predetermined angle.

With this, as an anchor sound, a sound in a direction in which sounds are comparatively accurately perceived, namely, a direction closer to the horizontal direction can be selected.

In addition, a recording medium according to one aspect of the present disclosure is a non-transitory computer-readable recording medium for use in a computer. The recording medium has a computer program recorded thereon for causing the computer to execute the above-described acoustic reproduction method.

With this, presentation of a sound image of a first sound can be improved. Specifically, a first sound image is made perceivable according to a relative positional relationship between the first sound image and a second sound image as an anchor sound. Therefore, it is possible to accurately present the sound image of the first sound, even when the first sound image is positioned in the height direction.

Moreover, an acoustic reproduction device according to one aspect of the present disclosure includes: a decoder that decodes an encoded sound signal that causes a user to perceive a first sound image; a first localizer that localizes, according to the encoded sound signal that has been decoded, the first sound image at a first position in a target space in which the user is present; and a second localizer that localizes, at a second position in the target space, a second sound image that represents an anchor sound for indicating a reference position.

With this, presentation of a sound image of a first sound can be improved. Specifically, a first sound image is made perceivable according to a relative positional relationship between the first sound image and a second sound image as an anchor sound. Therefore, it is possible to accurately present the sound image of the first sound, even when the first sound image is positioned in the height direction.

Note that these general or specific aspects may be realized by a system, a method, an integrated circuit, a computer program, or a non-transitory computer-readable recording medium such as a CD-ROM, or by any optional combination of systems, methods, integrated circuits, computer programs, or recording media.

Hereinafter, embodiments will be described in detail with reference to the drawings.

Note that the embodiments below each describe a general or specific example. The numerical values, shapes, materials, structural elements, the arrangement and connection of the structural elements, steps, orders of the steps etc. illustrated in the following embodiments are mere examples, and are not intended to limit the present disclosure.

Embodiment 1

Definition of Terms

First, the following provides definitions of technical terms that appear in the present disclosure.

An "encoded sound signal" includes a sound object that causes a user to perceive a sound image. The encoded sound signal may be a signal that adheres to, for example, the MPEG-H Audio standard. This sound signal includes a plurality of audio channels, and a sound object indicating a first sound image. The plurality of audio channels include, at the maximum, 64 or 128 audio channels, for example.

A "sound object" is data indicating a virtual sound image to be perceived by a user. Hereinafter, the sound object includes a sound of a first sound image and a first position indicating a position of the first sound image. Note that the term "sound" in a sound signal, a sound object, etc. does not exclusively connote a voice. The term applies to any audible sound.

"Localization of a sound image" refers to an act of causing a user to perceive a sound image at a virtual position in a target space in which the user is present by convolving each of a head-related transfer function (HRTF) for the left ear and an HRTF for the right ear with a sound signal.

A "binaural signal" is a signal obtained by convolving each of an HRTF for the left ear and an HRTF for the right ear with a sound signal that is the sound source of a sound image.

A "target space" is a virtual three-dimensional space or a real three-dimensional space in which a user is present. The target space is a three-dimensional space, such as VR, AR, MR, in which a user perceives sounds.

An "anchor sound" is a sound arriving from a sound image provided for causing a user to perceive a reference position in a target space. Hereinafter, a sound image that emits an anchor sound will be called a second sound image. Since the second sound image as an anchor sound makes a first sound image perceivable according to a relative positional relationship, the second sound image causes a user to more accurately perceive the position of a first sound image even when the first sound image is at a position in the height direction.

[Configuration]

Figure 2A:
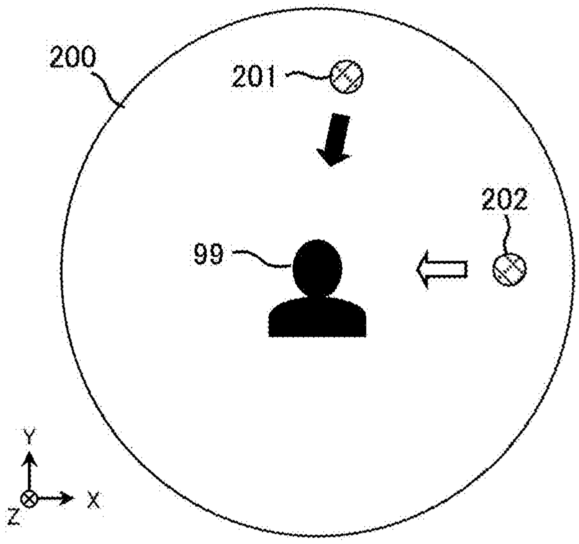
FIG. 2A is a diagram schematically illustrating a target space of the acoustic reproduction device according to Embodiment 1.

Next, a configuration of acoustic reproduction device 100 according to Embodiment 1 will be described. FIG. 1 is a block diagram illustrating an example of a configuration of acoustic reproduction device 100 according to Embodiment 1. FIG. 2A is a diagram schematically illustrating target space 200 of acoustic reproduction device 100 according to Embodiment 1. In FIG. 2A, the Z axis direction denotes the front direction toward which user 99 is facing, the Y axis direction denotes the upward direction, and the X axis direction denotes the right direction.

In FIG. 1, acoustic reproduction device 100 includes decoder 101, first localizer 102, second localizer 103, position estimator 104, anchor direction estimator 105, anchor sound producer 106, mixer 107, and headset 110. Headset 110 includes pair of headphones 111, head sensor 112, and microphone 113. Note that, in FIG. 1, the head of user 99 is schematically illustrated inside a frame surrounding headset 110.

Decoder 101 decodes an encoded sound signal. The encoded sound signal may be a signal that adheres to, for example, the MPEG-H Audio standard.

First localizer 102 localizes a first sound image at a first position in a target space in which user 99 is present, according to the position of a sound object included in the decoded sound signal, the relative position of user 99, and the direction of the head. From first localizer 102, a first binaural signal that causes the first sound image to localize at the first position is output. FIG. 2A schematically illustrates a situation in which first sound image 201 is localized in target space 200 in which user 99 is present. First sound image 201 is set at an optional position in target space 200 according to the sound object. It is difficult for user 99 to accurately perceive a position when first sound image 201 is localized in the up-down direction (i.e., the direction along the Y axis) with respect to user 99 as illustrated in FIG. 2A, compared to the case where first sound image 201 is localized in the horizontal direction (i.e., the direction along the X axis and the Z axis). Particularly for the case where an HRTF is not specific to a user or the case where headphones characteristics are not appropriately corrected, user 99 cannot accurately perceive the position of the first sound image.

Second localizer 103 localizes, at a second position in the target space, a second sound image representing an anchor sound for indicating a reference position. From second localizer 103, a second binaural signal that causes the second sound image to localize at the second position is output. In this case, second localizer 103 controls the volume and the frequency band of a second sound source such that the volume and the frequency band are appropriate for a first sound source and other reproduced sounds. For example, frequency characteristics of the second sound source may be controlled such that the crests and troughs of the frequency characteristics become smaller and flatter, or a signal may be controlled such that higher frequencies of the signal are emphasized. FIG. 2A schematically illustrates a situation in which second sound image 202 is localized in target space 200 in which user 99 is present. The second position may be a predetermined fixed position, or may be a position adaptably determined based on ambient sounds or reproduced sounds. The second position may be a predetermined position in front of the face of a user in the initial state, namely, a predetermined position in the Z axis direction, or may be a predetermined position in a range from the front of the face of user 99 to the right side as illustrated in FIG. 2A, for example. Second sound image 202 is localized in, for example, a direction close to the horizontal direction, namely, a direction from the horizontal direction to a direction within a predetermined angular range. Accordingly, an anchor sound is comparatively accurately perceived by user 99. Since the anchor sound makes the first sound image perceivable according to the relative positional relationship, user 99 can more accurately perceive the position of the first sound image even when the first sound image is at a position in the height direction. Note that localization of the first sound image and the second sound image may be simultaneously performed or need not be simultaneously performed. When the localization is not simultaneously performed, a shorter time interval between the first sound image localization and the second sound image localization allows a user to more accurately perceive the sound images.

Position estimator 104 obtains orientation information output from head sensor 112, and estimates a direction of the head of user 99, namely, a direction toward which the face is facing.

In response to a movement made by user 99, anchor direction estimator 105 estimates a new anchor direction, namely, the direction of a new second position, according to the direction estimated by position estimator 104. The estimated direction of the second position is notified to anchor sound producer 106.

Note that the anchor direction may be a fixed direction in reference to a target space, or may be a fixed direction determined depending on an environment.

Anchor sound producer 106 selectively obtains a sound arriving from the new anchor sound direction estimated by anchor direction estimator 105 from among ambient sounds picked up from every direction by microphone 113. Furthermore, using the selectively obtained sound as the sound source of an anchor sound, anchor sound producer 106 adjusts the intensity, namely, the volume and frequency characteristics of the selectively obtained sound to produce an appropriate anchor sound. The intensity and frequency characteristics of the anchor sound may be adjusted depending on the sound of the first sound image.

Mixer 107 mixes a first binaural signal output from first localizer 102 and a second binaural signal output from second localizer 103 together. A sound signal obtained by mixing the two binaural signals includes a left ear signal specific to the left ear and a right ear signal specific to the right ear, and is output to pair of headphones 111.

Pair of headphones 111 includes a left ear speaker and a right ear speaker. The left ear speaker converts the left ear signal into a sound, and the right ear speaker converts the right ear signal into a sound. Pair of headphones 111 may be a type of earphones inserted into the external ears.

Head sensor 112 detects a direction toward which the head of user 99 is directed, namely, a direction toward which the face is facing, and outputs the direction as orientation information. Head sensor 112 may be a sensor that detects information on six degrees of freedom (6 DOF) of the head of user 99. Head sensor 112 may be an inertial measurement unit (IMU), an accelerometer, a gyroscope, or a magnetometric sensor, or a combination thereof.

Microphone 113 picks up ambient sounds arriving at user 99 in the target space, and converts these ambient sounds into an electrical signal. Microphone 113 consists of, for example, a left microphone and a right microphone. The left microphone may be provided in the vicinity of the left ear speaker, and the right microphone may be provided in the vicinity of the right ear speaker. Note that microphone 113 may be a microphone having directionality which is capable of optionally designating a direction in which sounds are picked up, or may consist of three microphones. Moreover, microphone 113 may pick up sounds reproduced in pair of headphones 111, instead of or in addition to ambient sounds, and convert these sounds into an electrical signal. When the second sound image is localized, second localizer 103 may use, as the sound source of an anchor sound, some of reproduced sounds instead of ambient sounds that arrive at a user from the direction of the second position in the target space.

Note that headset 110 may be a unit separated from the main unit of acoustic reproduction device 100, or may be integrated with the main unit of acoustic reproduction device 100. When headset 110 is integrated with the main unit of acoustic reproduction device 100, headset 110 and acoustic reproduction device 100 may be wirelessly connected with each other.

[Operation]

Next, general operations performed by acoustic reproduction device 100 according to Embodiment 1 will be described.

Figure 2B:
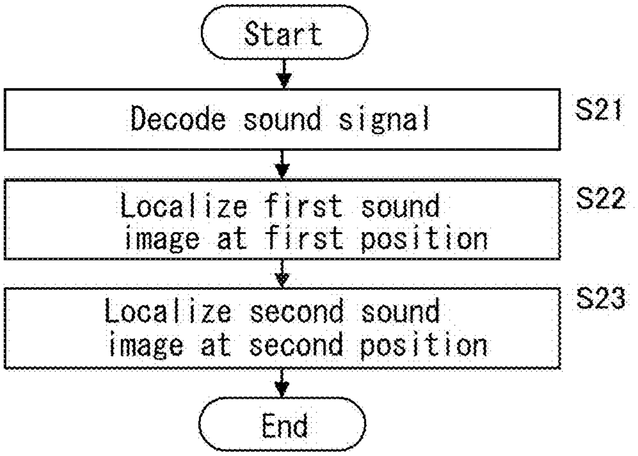
FIG. 2B is a flowchart illustrating one example of an acoustic reproduction method employed by the acoustic reproduction device according to Embodiment 1.

FIG. 2B is a flowchart illustrating one example of an acoustic reproduction method employed by acoustic reproduction device 100 according to Embodiment 1. Firstly, as illustrated in FIG. 2B, acoustic reproduction device 100 decodes an encoded sound signal that causes a user to perceive a first sound image (S21). Next, acoustic reproduction device 100 localizes the first sound image at a first position within a target space in which the user is present, according to the encoded sound signal that has been decoded (S22). Specifically, acoustic reproduction device 100 generates a first binaural signal by convolving each of an HRTF for the left ear and an HRTF for the right ear with the sound signal of the first sound image. Furthermore, acoustic reproduction device 100 localizes, at a second position in the target space, a second sound image representing an anchor sound for indicating a reference position (S23). Specifically, acoustic reproduction device 100 generates a second binaural signal by convolving each of an HRTF for the left ear and an HRTF for the right ear with a sound signal of an anchor sound represented by the second sound image. Acoustic reproduction device 100 repeatedly performs step S21 through step S23 at regular intervals. Alternatively, acoustic reproduction device 100 may repeatedly perform step S22 and step S23 at regular intervals while continuing decoding of a sound signal as a bitstream (S21).

Reproduction of a first binaural signal for localization of a first sound image and a second binaural signal for localization of a second sound image via pair of headphones 111 allows user 99 to perceive the first sound image and the second sound image. In this case, user 99 perceives the first sound image according to the relative positional relationship using an anchor sound from the second sound image as a reference. Accordingly, user 99 can more accurately perceive the position of the first sound image even when the first sound image is at a position in the height direction.

Note that as the sound source of an anchor sound to be emitted from the second sound image, sounds among ambient sounds arriving at user 99 which arrive from some direction or sounds among reproduced sounds which arrive from some direction can be used; however, the sound source of an anchor sound is not limited to the foregoing sounds. The sound source of an anchor sound may be predetermined sounds that are not out of tune with ambient sounds or reproduced sounds.

Embodiment 2

Next, acoustic reproduction device 100 according to Embodiment 2 will be described.

In Embodiment 2, sounds among ambient sounds arriving at a user in a target space from some direction are used as the sound source of an anchor sound. For example, acoustic reproduction device 100 obtains, using a microphone, ambient sounds arriving at the user in the target space, selectively obtains a sound that satisfies a predetermined condition from the obtained ambient sounds, and uses the selectively obtained sound as the sound source of the anchor sound in the step of localizing a second sound image. With this, a user can more accurately perceive the position of a first sound image according to the relative positional relationship with the anchor sound. In addition, since the anchor sound is a sound among the ambient sounds, the user hardly feels strange when they hear the anchor sound. As described above, it is readily possible to prevent an anchor sound from interfering with the sense of immersion that a user experience.

[Configuration]

Figure 3:
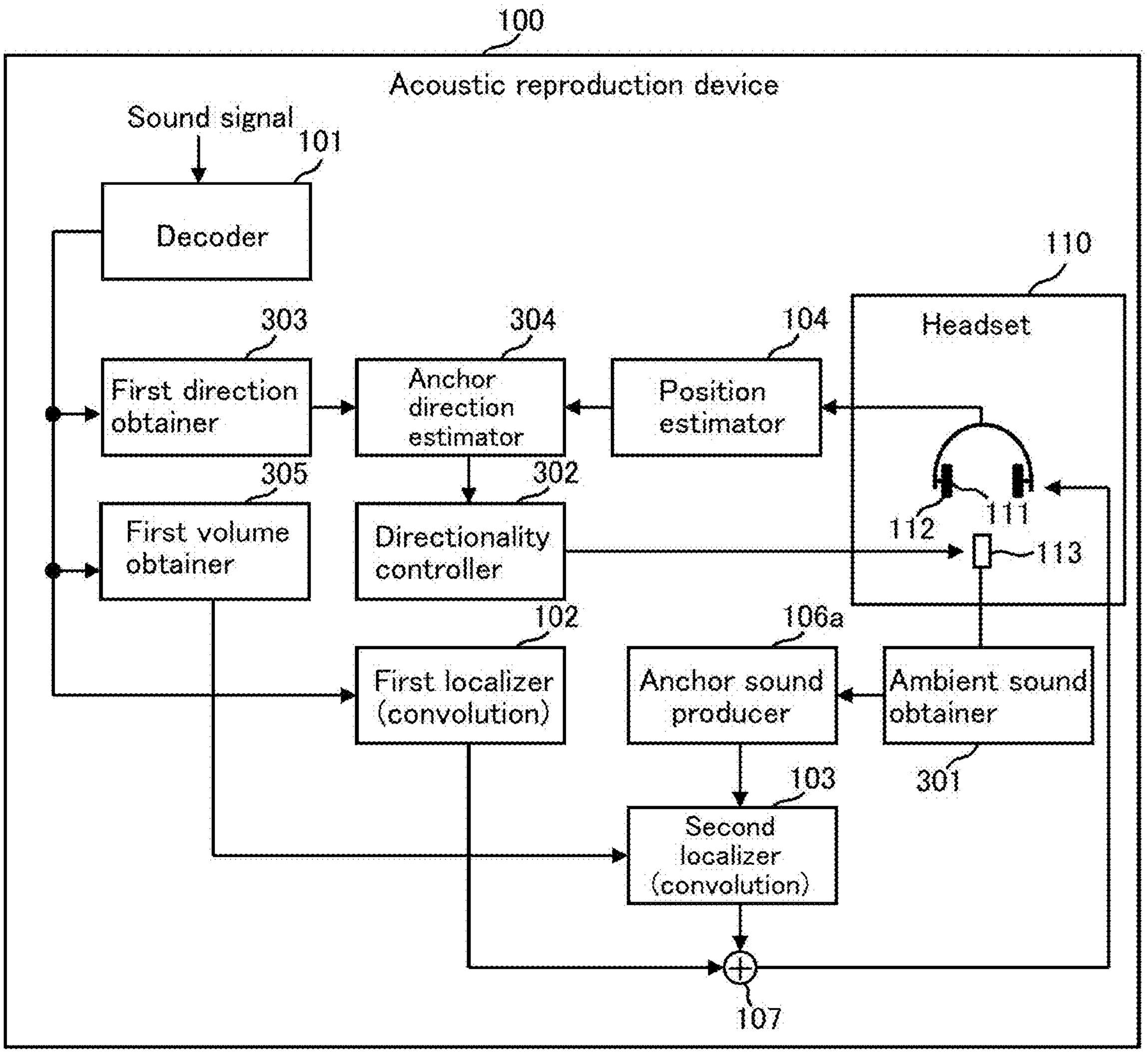
FIG. 3 is a block diagram illustrating an example of a configuration of an acoustic reproduction device according to Embodiment 2.

FIG. 3 is a block diagram illustrating an example of a configuration of an acoustic reproduction device according to Embodiment 2. Compared to FIG. 1, acoustic reproduction device 100 illustrated in FIG. 3 is different in that acoustic reproduction device 100 illustrated in FIG. 3 (i) further includes ambient sound obtainer 301, directionality controller 302, first direction obtainer 303, anchor direction estimator 304, and first volume obtainer 305, and (ii) includes anchor sound producer 106*a* instead of anchor sound producer 106. Hereinafter, different points will be mainly described.

Ambient sound obtainer 301 obtains ambient sounds picked up by microphone 113. Microphone 113 illustrated in FIG. 3 not only picks up ambient sounds in every direction, but also has directionality according to which sounds are picked up under control of directionality controller 302. Here, ambient sound obtainer 301 is to obtain, using microphone 113, ambient sounds in a direction in which a second sound image is to be localized.

Directionality controller 302 controls directionality of microphone 113 according to which sounds are picked up. Specifically, directionality controller 302 controls microphone 113 such that microphone 113 has directionality in a new anchor direction estimated by anchor direction estimator 304. Consequently, sounds picked up by microphone 113 are ambient sounds arriving from the new anchor direction, namely, the direction of a new second position, which is estimated in response to a movement made by user 99.

First direction obtainer 303 obtains the direction of a first sound image and the first position from a sound object decoded by decoder 101.

In response to a movement made by user 99, anchor direction estimator 304 estimates a new anchor direction, namely, the direction of a new second position, based on a direction toward which the face of user 99 is facing which is estimated by position estimator 104 and the direction of the first sound image which is obtained by first direction obtainer 303.

First volume obtainer 305 obtains first volume that is volume of the first sound image from the sound object decoded by decoder 101.

Anchor sound producer 106*a* produces an anchor sound using, as the sound source, ambient sounds obtained by ambient sound obtainer 301.

[Operation]

Next, operations performed by acoustic reproduction device 100 according to Embodiment 2 will be described.

Figure 4A:
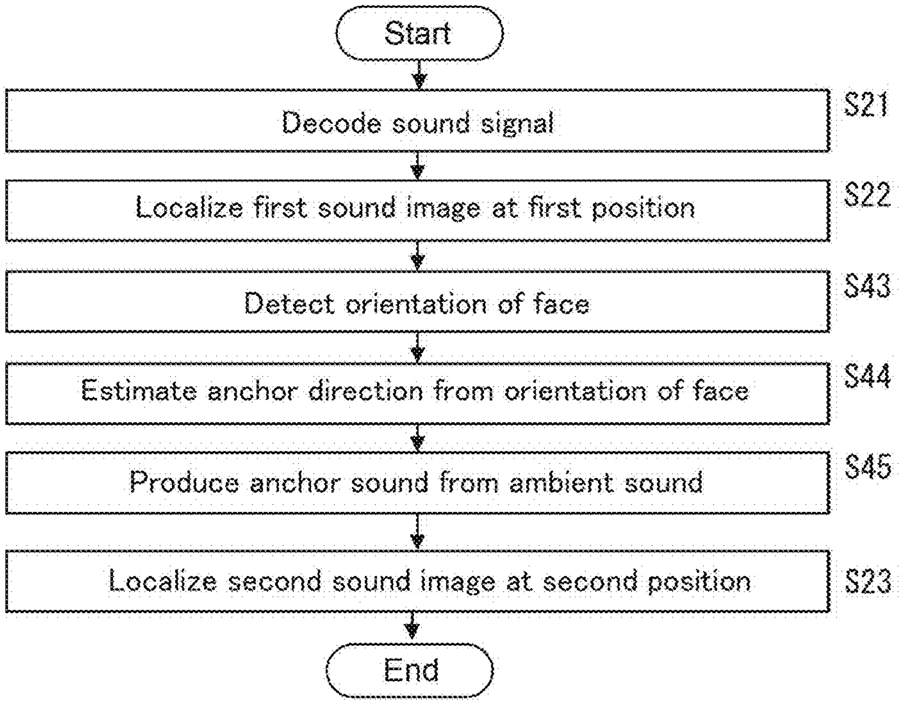
FIG. 4A is a flowchart illustrating one example of an acoustic reproduction method employed by the acoustic reproduction device according to Embodiment 2.

FIG. 4A is a flowchart illustrating one example of an acoustic reproduction method employed by acoustic reproduction device 100 according to Embodiment 2. Compared to FIG. 2B, FIG. 4A is different in that the acoustic reproduction method illustrated in FIG. 4A further includes step S43 through step S45. Hereinafter, different points will be mainly described.

Acoustic reproduction device 100 detects the orientation of the face of user 99 (S43), after the first sound image is localized in step S22. Detection of the orientation of the face is performed by head sensor 112 and position estimator 104.

Furthermore, acoustic reproduction device 100 estimates an anchor direction from the detected orientation of the face (S44). Estimation of the anchor direction is performed by anchor direction estimator 304. Specifically, anchor direction estimator 304 estimates a new anchor direction, namely, the direction of a new second position when the head of user 99 moves. When the head of user 99 does not move, acoustic reproduction device 100 estimates a direction same as the current anchor direction as a new anchor direction.

Next, acoustic reproduction device 100 produces an anchor sound using ambient sounds arriving from the estimated anchor direction as the sound source (S45). Obtainment of the ambient sounds arriving from the estimated anchor direction is performed by directionality controller 302, microphone 113, and ambient sound obtainer 301. Production of the anchor sound using the ambient sounds as the sound source is performed by anchor sound producer 106*a*.

Thereafter, acoustic reproduction device 100 localizes a second sound image representing the anchor sound at the second position in the estimated anchor direction (S23).

According to FIG. 4A, acoustic reproduction device 100 can track a movement of the head of user 99 and localize the second sound image.

Note that a second position at which a second sound image is localized may be predetermined, but may be adaptably determined based on ambient sounds. Next, processing for adaptably determining a second position based on ambient sounds will be exemplified.

Figure 4B:
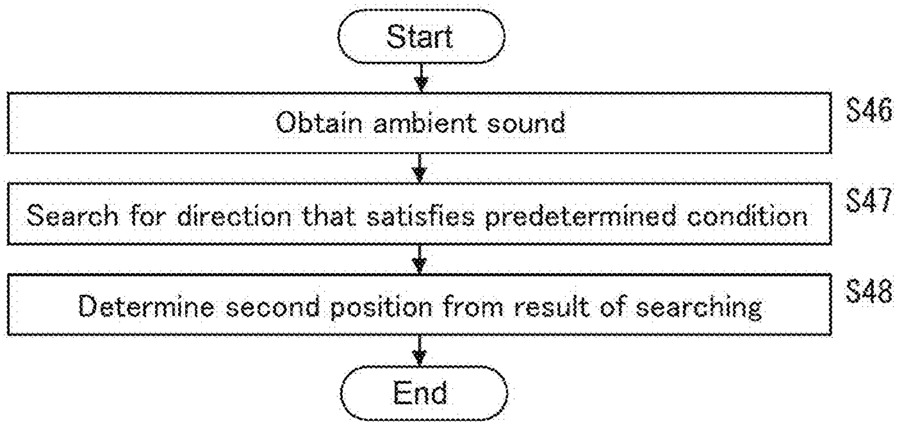
FIG. 4B is a flowchart illustrating an example of processing for adaptably determining a second position in the acoustic reproduction device according to Embodiment 2.

FIG. 4B is a flowchart illustrating an example of processing for adaptably determining a second position in the acoustic reproduction device according to Embodiment 2. Acoustic reproduction device 100 performs the processes illustrated in FIG. 4B before the processes illustrated in FIG. 4A are performed, for example. Furthermore, acoustic reproduction device 100 repeatedly perform the processes illustrated in FIG. 4B in parallel with the processes illustrated in FIG. 4A. As illustrated in FIG. 4B, acoustic reproduction device 100 obtains, using a microphone, ambient sounds arriving at user 99 in a target space (S46). The ambient sounds to be obtained in this case are ambient sounds obtained from every direction or from the entire perimeter of an angular range including the horizontal direction. Furthermore, acoustic reproduction device 100 searches for a direction that satisfies a predetermined condition from the obtained ambient sounds (S47). For example, acoustic reproduction device 100 selectively obtains a sound that satisfies a predetermined condition from among the obtained ambient sounds, and determines an arrival direction of the sound to be a direction that satisfies the predetermined condition. Furthermore, acoustic reproduction device 100 determines the second position such that the second position is present in a direction obtained as a result of the searching (S48).

Here, a predetermined condition will be described. A predetermined condition relates to at least one of an arrival direction of a sound, duration of the sound, intensity of the sound, a frequency of the sound, and a type of the sound.

For example, as a condition indicating the arrival direction of a sound, the predetermined condition includes an angular range indicating a direction (i) not including the vertical direction with respect to a user, and (ii) including the forward direction and the horizontal direction with respect to the user. With this, a sound in a direction in which sounds are comparatively accurately perceived, namely, a direction closer to the horizontal direction, can be selected as an anchor sound.

Moreover, as a condition indicating the intensity of a sound, the predetermined condition may include a predetermined intensity range. With this, a sound having appropriate intensity can be selected as an anchor sound.

Furthermore, as a condition indicating the frequency of a sound, the predetermined condition may include a particular frequency range. With this, a sound with an appropriate frequency which is readily perceived can be selected as an anchor sound.

In addition, as a condition indicating the type of a sound, the predetermined condition may include a human voice or a special sound. With this, an appropriate sound can be selected as an anchor sound.

Furthermore, as a condition indicating the duration of a sound, the predetermined condition may include continuation of at least a predetermined time period or an interruption of at least a predetermined period. With this, an appropriate sound having distinctive temporal characteristics can be selected as an anchor sound. Satisfaction of a predetermined condition by the sound source of an anchor sound can produce an appropriate anchor sound that would not make user 99 feel strange.

According to FIG. 4B, the second position at which the second sound image is localized can be adaptably determined according to ambient sounds. Moreover, as the sound source of an anchor sound, sounds among ambient sounds which arrive from some direction can be used.

Note that acoustic reproduction device 100 according to each embodiment may include a head mounted display (HMD) instead of headset 110. In this case, the HMD is to include a display, in addition to pair of headphones 111, head sensor 112, and microphone 113. Moreover, the main unit of the HMD may be provided with acoustic reproduction device 100.

Figure 5:
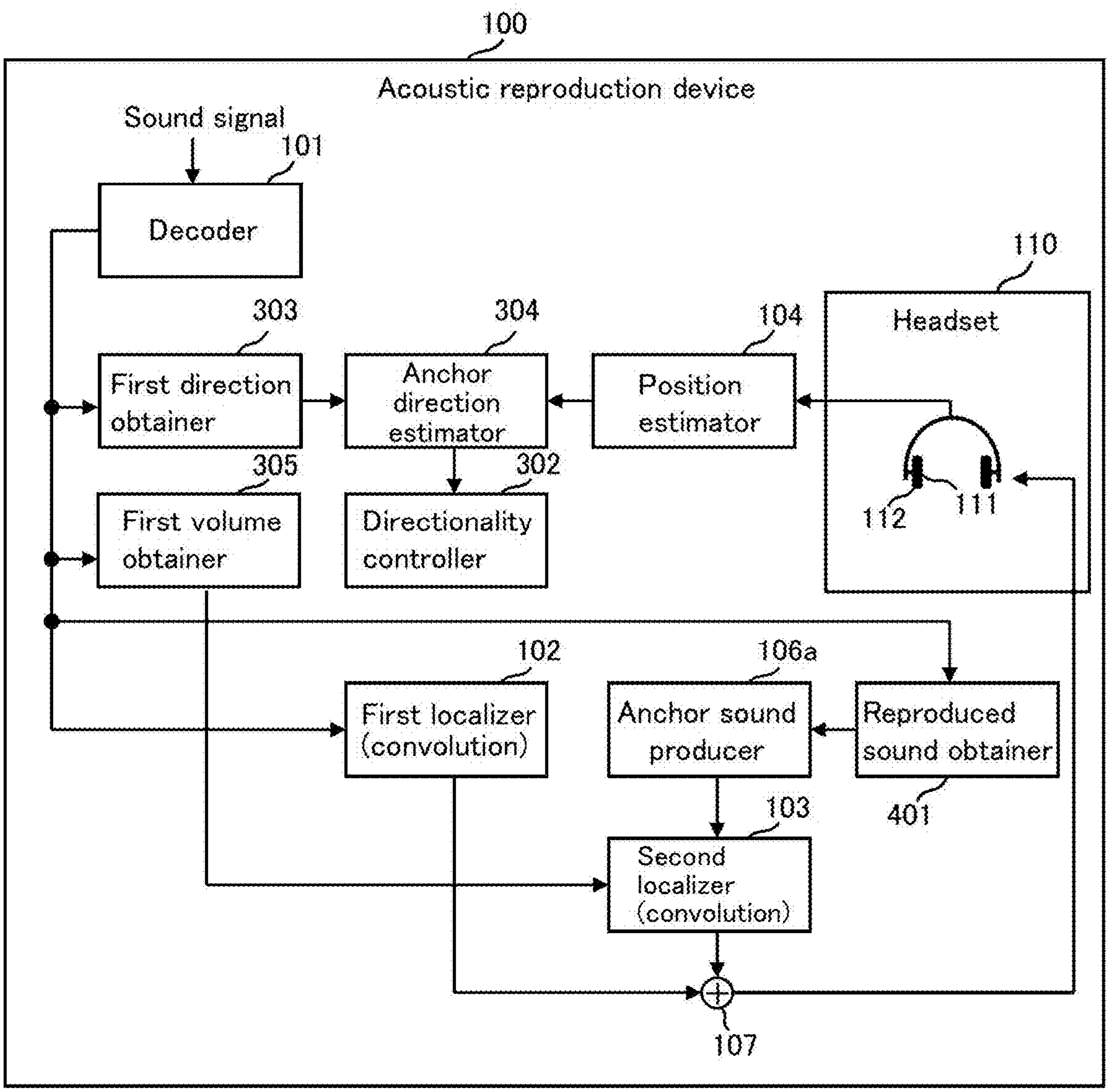
FIG. 5 is a block diagram illustrating a variation of the acoustic reproduction device according to Embodiment 2.

In addition, the acoustic reproduction device according to Embodiment 2 which is illustrated in FIG. 3 may be modified as follows. FIG. 5 is a block diagram illustrating a variation of acoustic reproduction device 100 according to Embodiment 2. In this variation, a configuration that uses reproduced sounds instead of ambient sounds is exemplified. Compared to FIG. 3, acoustic reproduction device 100 illustrated in FIG. 5 is different in that acoustic reproduction device 100 illustrated in FIG. 5 includes reproduced sound obtainer 401 instead of ambient sound obtainer 301.

Reproduced sound obtainer 401 obtains a reproduced sounds decoded by decoder 101. Anchor sound producer **106*a* produces an anchor sound using, as the sound source, the reproduced sounds obtained by reproduced sound obtainer 401. For example, acoustic reproduction device 100 illustrated in FIG. 5** reproduces a sound signal including audio channels different from audio channels of a first sound source, selectively obtains a sound that satisfies a predetermined condition from among the reproduced sounds included in the reproduced sound signal, and uses the selectively obtained sound as the sound source of an anchor sound. With this, a user can more accurately perceive the position of a first sound image according to a relative positional relationship with the anchor sound. In addition, since the anchor sound is a sound among the reproduced sounds, the user hardly feels strange when they hear the anchor sound. As described above, it is readily possible to prevent an anchor sound from interfering with the sense of immersion that a user experience.

Other Embodiments

Hereinbefore, the acoustic reproduction devices and the acoustic reproduction methods according to aspects of the present disclosure have been described based on the embodiments, yet the present disclosure is not limited to these embodiments. For example, the present disclosure may include, as embodiments of the present disclosure, different embodiments realized by (i) optionally combining the structural elements described in the specification, and (ii) excluding some of the structural elements described in the specification. Moreover, the present disclosure also includes variations achieved by applying various modifications conceivable to those skilled in the art to each of the embodiments etc. without departing from the essence of the present disclosure, or in other words, without departing from the meaning of wording recited in the claims.

The following may also be included within a range of one or more aspects of the present disclosure.

(1) Some of the structural elements included in the above-described acoustic reproduction devices may be realized as a computer system including a microprocessor, read-only memory (ROM), random-access memory (RAM), a hard disk unit, a display unit, a keyboard, a mouse, etc. The RAM or the hard disk unit stores a computer program. The microprocessor fulfills its function by operating according to the computer program. Here, the computer program includes a combination of a plurality of instruction codes each indicating an instruction to the computer for fulfilling a predetermined function.

Figure 6:
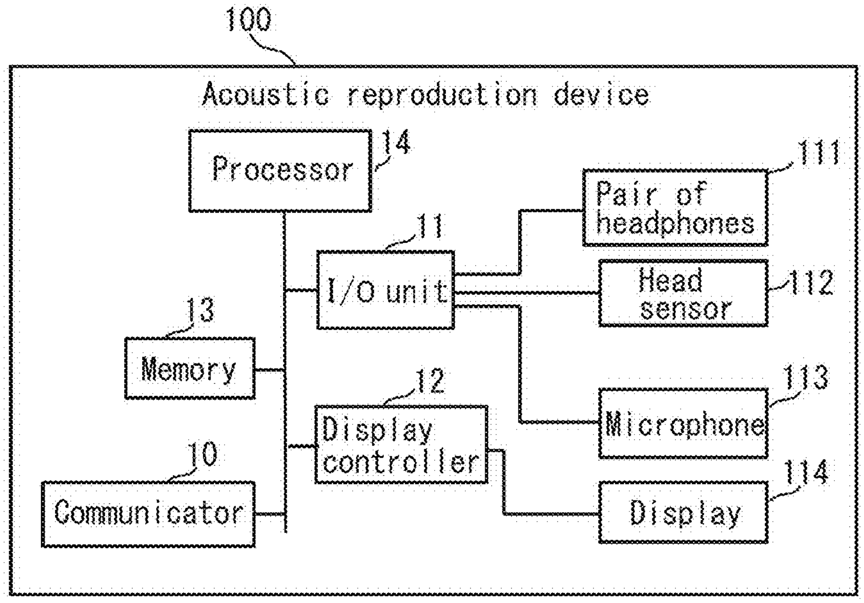
FIG. 6 is a diagram illustrating an example of a hardware configuration of the acoustic reproduction device according to Embodiments 1 and 2.

Acoustic reproduction device 100 as described above may have a hardware configuration as illustrated in FIG. 6, for example. Acoustic reproduction device 100 illustrated in FIG. 6 includes input/output (I/O) unit 11, display controller 12, memory 13, processor 14, pair of headphones 111, head sensor 112, microphone 113, and display 114. Some of the structural elements included in acoustic reproduction device 100 according to Embodiments 1 through 2 fulfill its function by processor 14 executing a program stored in memory 13. The hardware configuration illustrated in FIG. 6 may be a head-mounted display (HMD), a combination of headset 110 and a tablet-type terminal, a combination of headset 110 and a smartphone, or a combination of headset 110 and an information processing device (e.g., a personal computer (PC) or a television), for example.

(2) Some of the structural elements included in the above-described acoustic reproduction devices and acoustic reproduction methods may be configured from a single system large-scale integration (LSI) circuit. The system LSI circuit is a super-multifunction LSI circuit manufactured with a plurality of components integrated on a single chip. Specifically, the system LSI circuit is a computer system including a microprocessor, ROM, and RAM, for example. The RAM stores a computer program. The system LSI circuit fulfills its function as a result of the microprocessor operating according to the computer program.

(3) Some of structural elements included in the above-described acoustic reproduction devices may be configured from an IC card detachable from devices or a stand-alone module. The IC card or the module is a computer system configured from a microprocessor, ROM, and RAM, for example. The IC card or the module may include the above-described super-multifunction LSI circuit. The IC card or the module fulfills its function as a result of the microprocessor operating according to a computer program. The IC card or the module may be tamper-proof.

(4) Moreover, some of structural elements included in the above-described acoustic reproduction devices may be realized as the computer program or the digital signal recorded on a computer-readable recording medium, such as a flexible disk, hard disk, CD-ROM, magneto-optical disk (MO), DVD, DVD-ROM, DVD-RAM, Blu-ray Disc (BD, registered trademark), and semiconductor memory. In addition, some of structural elements included in the above-described acoustic reproduction devices may be digital signals recorded on these recording media.

Some of structural elements included in the above-described acoustic reproduction devices may be realized by transmitting the computer program or the digital signal via an electric communication line, a wireless or wired line, a network epitomized by the Internet, data broadcasting, etc.

(5) The present disclosure may be realized as the methods described above. The present disclosure may also be realized as a computer program realizing such methods using a computer, or as a digital signal of the computer program.

(6) Moreover, the present disclosure may be a computer system including a microprocessor and memory. The memory may store the computer program, and the microprocessor may operate according to the computer program.

(7) In addition, another independent computer system may execute the program or the digital signal by receiving a transmitted recording medium on which the program or the digital signal is recorded, or by receiving the program or the digital signal transmitted via the network.

(8) The present disclosure may be realized by combining the above-described embodiments and variations.

It should be noted that, in the above-described embodiments, each of the structural elements may be configured as a dedicated hardware product or may be realized by a microprocessor executing a software program suitable for the structural element. Each element may be realized as a result of a program execution unit, such as a central processing unit (CPU), processor or the like, loading and executing a software program stored in a storage medium such as a hard disk or a semiconductor memory.

In addition, the present disclosure is not limited to the above-described embodiments. The scope of the one or more aspects of the present disclosure may encompass embodiments as a result of making, to the embodiments, various modifications that may be conceived by those skilled in the art and combining structural elements in different embodiments, as long as the resultant embodiments do not depart from the scope of the present disclosure.

INDUSTRIAL APPLICABILITY

The present disclosure is applicable to an acoustic reproduction device and an acoustic reproduction method. For example, the present disclosure is applicable to a stereophonic reproduction device.

The invention claimed is:

1. An acoustic reproduction method comprising:

obtaining a sound signal indicating a first sound image and positional information pertaining to a first position indicating a position of the first sound image;

localizing, based on the positional information, the first sound image at the first position in a target space in which a user is present; and localizing a second sound image for indicating a reference position at a second position in the target space, the second position being determined using a position of the user as a reference, wherein the localization of the second sound image makes the first sound image perceivable by the user according to a relative positional relationship between the first sound image and the second sound image.

2. The acoustic reproduction method according to claim 1, wherein the second position is determined according to a frontal direction in which a face of the user faces or a horizontal direction corresponding to the position of the user as the reference.

3. The acoustic reproduction method according to claim 1, further comprising:

obtaining, using a microphone, ambient sounds arriving at the user from a direction of the second position in the target space, wherein in the localizing of the second sound image, the ambient sounds obtained are used as a sound source for indicating the reference position.

4. The acoustic reproduction method according to claim 1, further comprising:

obtaining, using a microphone, ambient sounds arriving at the user in the target space;

selectively obtaining, from among the ambient sounds obtained, a sound that satisfies a predetermined condition; and determining a position in a direction of the sound selectively obtained to be the second position.

5. The acoustic reproduction method according to claim 4, wherein the predetermined condition relates to at least one of an arrival direction of a sound, duration of a sound, intensity of a sound, a frequency of a sound, and a type of a sound.

6. The acoustic reproduction method according to claim 4, wherein as a condition indicating an arrival direction of a sound, the predetermined condition includes an angular range indicating a direction (i) not including a vertical direction with respect to the user, and (ii) including a forward direction and a horizontal direction with respect to the user.

7. The acoustic reproduction method according to claim 4, wherein as a condition indicating intensity of a sound, the predetermined condition includes a predetermined intensity range.

8. The acoustic reproduction method according to claim 4, wherein as a condition indicating a frequency of a sound, the predetermined condition includes a predetermined frequency range.

9. The acoustic reproduction method according to claim 4, wherein as a condition indicating a type of a sound, the predetermined condition includes a human voice or a special sound.

10. The acoustic reproduction method according to claim 1, wherein the localizing of the second sound image includes adjusting intensity of a second sound source according to intensity of a first sound source.

11. The acoustic reproduction method according to claim 1, wherein an elevation angle or a depression angle of the second position with respect to the user is smaller than a predetermined angle.

12. A non-transitory computer-readable recording medium for use in a computer, the recording medium having a computer program recorded thereon for causing the computer to execute the acoustic reproduction method according to claim 1.

13. An acoustic reproduction device comprising:

a decoder that decodes an encoded sound signal to obtain a sound signal indicating a first sound image and positional information pertaining to a first position indicating a position of the first sound image;

a first localizer that localizes, based on the positional information, the first sound image at the first position in a target space in which the user is present; and a second localizer that localizes a second sound image for indicating a reference position at a second position in the target space, the second position being determined using a position of the user as a reference, wherein the localization of the second sound image makes the first sound image perceivable by the user according to a relative positional relationship between the first sound image and the second sound image.

14. The acoustic reproduction method according to claim 1, wherein the second position is closer to the horizontal direction than the first position is.

15. The acoustic reproduction method according to claim 1, wherein the second position is changed based on a change in an orientation of the face of the user.

16. The acoustic reproduction method according to claim 1, wherein the second position is determined according to a frontal direction in which a face of the user faces or a horizontal direction corresponding to the position of the user as the reference.

* * * * *